United States Patent [19]

Shimozato et al.

[11] 3,856,729

[45] Dec. 24, 1974

[54] BUTADIENE RUBBER COMPOSITION

[75] Inventors: Joji Shimozato, Tokyo; Masashi Umeno, Kawasaki; Shiro Yabuta, Tokyo, all of Japan

[73] Assignee: Japan Synthetic Rubber Co., Ltd., Tokyo, Japan

[22] Filed: Apr. 13, 1972

[21] Appl. No.: 243,828

[30] Foreign Application Priority Data

Apr. 15, 1971 Japan............................... 46-23442

[52] U.S. Cl.............. 260/23.7 M, 260/33.6 UA, 261/79.5 B
[51] Int. Cl....................... C08c 11/72, C08d 9/14
[58] Field of Search........ 260/23.7 M, 35.6, 94.9 G, 260/79.5 B

[56] References Cited
UNITED STATES PATENTS

| | | | |
|---|---|---|---|
| 2,903,439 | 9/1959 | Wolf............................. | 260/23.7 M |
| 2,939,898 | 6/1960 | Aron............................. | 260/23.7 M |
| 2,954,356 | 9/1960 | Merrifield..................... | 260/23.7 M |
| 3,238,176 | 3/1966 | Brooks et al.................. | 260/94.9 G |
| 3,320,219 | 5/1967 | Dibbo........................... | 260/79.5 B |
| 3,591,548 | 7/1971 | Beckman et al. ............. | 260/23.7 M |
| 3,607,819 | 9/1971 | Beckman et al. ............. | 260/23.7 M |
| 3,637,555 | 1/1972 | Marinacci et al. ............ | 260/23.7 M |
| 3,649,587 | 3/1972 | Beckman et al. ............. | 260/23.7 M |

OTHER PUBLICATIONS

"Whitby" Synthetic rubber, 1956, pp. 388–396.

*Primary Examiner*—Melvyn I. Marquis
*Assistant Examiner*—William E. Parker
*Attorney, Agent, or Firm*—Wenderoth, Lind & Ponack

[57] ABSTRACT

A composition for making vulcanized butadiene rubber, wherein the amounts of sulfur as a vulcanizing agent and of zinc oxide as a vulcanizing activator are greatly reduced as compared with the conventional rubber compositions. By vulcanizing such a rubber composition, there can be produced vulcanized butadiene rubber having high tear strength, tensile strength and resistance to aging which have been unable to be realized by the conventional butadiene rubbers.

10 Claims, No Drawings

BUTADIENE RUBBER COMPOSITION

This invention relates to a composition for use in preparing a vulcanized butadiene rubber having high tear strength and elongation and superior resistance to aging, and to a vulcanized butadiene rubber prepared from said composition.

By the butadiene rubber or rubber based on butadiene, as used in the present specification and claims, is meant a synthetic rubber obtained by polymerization of butadiene or copolymerization of butadiene with a comonomer. Typical examples include polybutadiene rubber (BR), styrene-butadiene rubber (SBR) and acrylonitrile-butadiene rubber (NBR).

Vulcanized butadiene rubbers generally have a small tear strength as compared with vulcanized natural rubber, and therefore, have limited utility in applications in a wide range of fields such as in the field of automobile tires. Furthermore, because of their small tear strength, they undergo rupture at the time of mold releasing after vulcanization and fabrication, and frequently become poor products. It has previously been thought in general that these defects are inherent to butadiene rubbers, and cannot be avoided by changing the formulation of the composition.

As is well known, conventional rubber compositions for making vulcanized butadiene rubbers fundamentally comprises a rubber component based on butadiene, sulfur as a vulcanizing agent, a vulcanizing accelerator, a vulcanizing activator, a reinforcing agent and additives. It has been recognized in the art on the basis of long years' experience that in the case of using rubber for tire tread sulfur should be present in an amount of 1 to 2.5 PHR (parts per hundred parts by weight of rubber component), and the vulcanizing activator such as zinc oxide, in an amount of about 3 to about 5 PHR. In one of the prior proposals, sulfur is used in a reduced amount of 0.5 to 1.5 PHR. However, when, at this time, 3 to 5 PHR of zinc oxide is used, the tear strength of the resulting vulcanized butadiene rubber is not improved to an appreciable degree. In addition, the hardness and modulus of the rubber increase, and particularly, the rubber has a reduced elongation after heat-aging.

It has now been found that a vulcanized butadiene rubber of markedly improved tear strength, elongation and resistance to ageing can be obtained by vulcanizing a rubber composition having the conventional constituents as mentioned above but containing sulfur as a vulcanizing agent and zinc oxide as a vulcanizing activator in reduced amounts of 0.1 to 0.8 PHR, preferably 0.1 to 0.6 PHR, and 0.1 to 1.0 PHR, preferably 0.1 to 0.5 PHR, respectively. The amounts of these two ingredients are remarkably smaller than those which have been generally used heretofor. In view of the fact that it has previously been thought that substantial improvement of the properties of the vulcanized butadiene rubber could not be obtained by changing the formulation of the conventional rubber composition, it is indeed surprising that the present invention has made it possible to provide a rubber product of improved properties.

In addition to zinc oxide mentioned above, lead monoxide, cadmium oxide and zinc salts can be used as the vulcanizing activator. The amount of zinc oxide is 0.1 to 1.0 PHR, preferably 0.1 to 0.5 PHR as mentioned above. This amount corresponds to 1.23 to 12.3 milligram atoms, preferably 1.23 to 6.2 milligram atoms, per 100 grams of the rubber component, as zinc metal. In the case of using lead monoxide, cadmium oxide and zinc salts instead of zinc oxide, the same amount based on the milligram atom of the respective metals is employed. Suitable zinc salts include, for example, zinc carbonate, lithopone, i.e., a mixture of zinc sulfide and barium sulfate, fatty acid salts such as zinc stearate and zinc oleate, dithioacid salts such as zinc dimethyl dithiocarbamate and thiazol salt such as zinc salt of mercaptobenzothiazole.

In the rubber composition of this invention, the presence of at least one of zinc oxide, zinc salt, lead monoxide and cadmium oxide in a specific amount is necessary for use as a vulcanizing activator, but other activators can also be incorporated simultaneously. These conventional activators include, for example, stearic acid, and thiourea derivatives. Specific examples of the thiourea derivatives are dialkylthioureas such as diethylthiourea and dibutylthiourea, and diarylthioureas such as diphenylthiourea and ditolylthiourea. According to the present invention, it has been found that vulcanized butadiene rubber of especially superior quality can be obtained when the thiourea derivative is conjointly present together with zinc oxide or other abovementioned metal compound as the vulcanizing activator. The amount of the activator of the thiourea derivative is within the range of 0.1 to 1.0 PHR. It has been known that such thiourea derivatives have an action of a vulcanizing activator. However, the use of this thiourea derivative alone cannot lead to the achievement of tight cure because of slow rate of vulcanization; the resulting vulcanized rubber has a large permanent compression set and is poor in rebound. It has been unexpected that by the conjoint use of the thiourea derivative with zinc oxide or other metal compound as in the present invention, excellent vulcanized butadiene rubber can be obtained without undergoing such defects.

The rubber composition of this invention can contain a conventional antioxidant. Antioxidants have often been used as one compounding ingredient of rubber composition, and a wide variety of antioxidants have been known. When the rubber composition of this invention contains an antioxidant, those of the amine type are especially preferred. Specific examples are aldol-$\alpha$-naphthylamine, phenyl-$\beta$-naphthylamine and para-phenylene diamines. The amount of the amine-type antioxidant is up to 2.5 PHR, preferably 0.5 to 2.5 PHR. The use of such antioxidant produces not only an effect of age-resistance as in the conventional rubber, but also an unexpected effect of inhibiting the rebound of vulcanized butadiene rubber. The degree of rebound can be controlled by the amount of the antioxidant. For example, where it is desired to prevent slippage of a tire tread rubber, the amount of the amine-type antioxidant is increased within the above-specified range, thereby to increases the dyanmic loss angle of the tread rubber. This fact has been discovered for the first time by the present invention, and cannot be expected from the prior art.

The rubber composition of this invention contains the butadiene rubber component, sulfur as a vulcanizing agent, the vulcanizing activator, and the antioxidant as an optional ingredient, and the conventional vulcanizing accelerator, reinforcing agent and desired additives. All of the conventional vulcanizing accelerators can be used, and sulfenamides such as N-cyclohexylbenzothiazyl sulfenamide and N-oxydiethylene-2- benzothiazole sulfenamide, and thiurams such as tetraethyl thiuram disulfide and tetramethyl-thiuram disulfide are especially preferred. The preferred amount of the vulcanizing accelerator is 0.5 to 2.5 PHR. Examples of the conventional reinforcing agent include carbon black, white carbon (finely divided silica), and clay. The preferred amount of the reinforcing agent is up to 70 PHR. If desired, up to 50 PHR of a conventional processing oil such as paraffinic oil, aromatic oil and naphthenic oil, and a small amount of additives such as pigments can also be incorporated in the rubber composition of this invention.

Excellent vulcanized butadiene rubber can be obtained by subjecting the rubber composition of this invention to a conventional vulcanizing operation. The vulcanizing temperature is usually 130° to 170°C., and the vulcanizing time is from 10 minutes to 30 minutes according to the temperature. The vulcanized butadiene rubber obtained is characterized by its far higher tear strength and elongation and resistance to heat ageing than the butadiene rubber products which have been known previously. By the resistance to heat ageing is meant a lesser degree of reduction in tensile strength and elongation and rise in modulus and hardness. The vulcanized butadiene rubber having such superior properties has been realized for the first time by the present invention, and cannot be expected from the prior art.

The effects produced by the present invention are attained in all butadiene rubbers such as styrene-butadiene rubber (SBR) or acrylonitrile-butadiene rubber (NBR). They are especially outstanding with polybutadiene rubber (BR).

The present invention will be specifically illustrated by the following Examples and Comparative Examples. The Comparative Examples are in accordance with the conventional recipes.

Example 1

A. Recipe

| Run No. | Examples of BR | | |
|---|---|---|---|
| | 1 | 2 | 3(comparison) |
| BR (JSR BR 01)[1] | 100 | 100 | 100 |
| ZnO | 0.4 (4.9)* | 0 | 3 (36.9)* |
| Diethylthiourea | 0.3 | 0.3 | 0 |
| Zinc stearate | 0 | 4 (6.3)* | 0 |
| Stearic acid | 0 | 0 | 1 |
| Vulcanization accelerator CZ[2] | 1.6 | 1.6 | 1.6 |
| Vulcanization accelerator TET[3] | 0.2 | 0.2 | 0.2 |
| Sulfur | 0.6 | 0.6 | 1.2 |
| Antioxidant (C)[4] | 1.7 | 1.7 | 0 |
| Carbon black | 50 | 50 | 50 |

* The figure in the parenthesis is the milligram atom of metal per 100 g of the rubber component; this will apply to all cases appearing hereinafter.
[1] Cis-polybutadiene, product of Japan Synthetic Rubber Co., Ltd.
[2] N-Cyclohexylbenzothiazyl sulfenamide
[3] Tetraethylthiuram disulfide
[4] Aldol-α-naphthylamine

B. Properties of the Vulcanized Rubber.

Each of the compounded compositions according to the above recipe was vulcanized at 150°C. for 15 minutes, and the resulting vulcanized rubber was aged at 100°C. for 24 hours. The properties before and after the ageing were measured, and the results are shown below.

| Run No. | 1 | 2 | 3(comparison) |
|---|---|---|---|
| Tear strength (Kg/cm) | | | |
| Before aging | 96 | 83 | 32 |
| After aging | 81 | 68 | 26 |
| Tensile strength (Kg/cm$^2$) | | | |
| Before aging | 214 | 196 | 194 |
| After aging | 210 | 196 | 195 |
| Elongation (%) | | | |
| Before aging | 680 | 710 | 380 |
| After aging | 580 | 710 | 270 |
| 300 % Modulus (Kg/cm$^2$) | | | |
| Before aging | 64 | 57 | 142 |
| After aging | 86 | 57 | — |
| Hardness (JIS K6301) | | | |
| Before aging | 61 | 59 | 70 |
| After aging | 64 | 59 | 73 |
| Rebound (JIS K6301; %) | | | |
| Before aging | 49 | 47 | 63 |
| Permanent compression set (JIS K6301; %) | | | |
| Before aging | 24 | 34 | 28 |

Example 2

A. Recipe

| | Example of SBR | | |
|---|---|---|---|
| Run No. | 4 | 5 | (comparison) |
| SBR (No. 1502) | 100 | 100 | |
| ZnO | 0 | 3 | (36.9) |
| Diethylthiourea | 0.3 | 0 | |
| Zinc stearate | 4 (6.3) | 0 | |
| Stearic acid | 0 | 3 | |
| Vulcanization accelerator CZ | 1.6 | 1.6 | |
| Vulcanization accelerator TET | 0.2 | 0.2 | |
| Sulfur | 0.7 | 1.2 | |
| Antioxidant (C) | 1.7 | 0 | |
| Carbon black | 50 | 50 | |

Example 2 — Continued

Example of SBR

B. Properties of Vulcanized Rubber (vulcanized at 150°C. for 15 minutes, and aged at 100°C. for 24 hours)

| Run No. | 4 | 5 | (comparison) |
|---|---|---|---|
| Tear strength (Kg/cm) | | | |
|   Before aging | 56 | 43 | |
|   After aging | 44 | 26 | |
| Tensile strength (Kg/cm$^2$) | | | |
|   Before aging | 164 | 279 | |
|   After aging | 151 | 240 | |
| Elongation (%) | | | |
|   Before aging | 810 | 450 | |
|   After aging | 620 | 260 | |
| 300% Modulus (Kg/cm$^2$) | | | |
|   Before aging | 44 | 174 | |
|   After aging | 61 | — | |
| Hardness | | | |
|   Before aging | 62 | 72 | |
|   After aging | 64 | 75 | |
| Rebound (%) | | | |
|   Before aging | 47 | 49 | |
| Permanent compression set (%) | | | |
|   Before aging | 58 | 37 | |

Example 3

Example of NBR

A. Recipe

| Run No. | 6 | | 7 | (comparison) |
|---|---|---|---|---|
| NBR (JSR N230S) (1) | 100 | | 100 | |
| ZnO | 0 | | 5 | (61.5) |
| Diethyl thiourea | 0.3 | | 0 | |
| Zinc stearate | 4 | (6.3) | 0 | |
| Stearic acid | 0 | | 1 | |
| Vulcanization accelerator CZ | 1.6 | | 1.6 | |
| Vulcanization accelerator TET | 0.2 | | 0.2 | |
| Sulfur | 0.5 | | 0.5 | |
| Amine-type antioxidant (C) | 1.7 | | 0 | |
| Carbon black | 50 | | 50 | |

B. Properties of vulcanized rubber (vulcanized at 150°C. for 15 minutes, and aged at 100°C. for 24 hours)

| Run No. | 6 | 7 | (comparison) |
|---|---|---|---|
| Tear strength (Kg/cm) | | | |
|   Before aging | 58 | 54 | |
|   After aging | 52 | 39 | |
| Tensile strength (Kg/cm$^2$) | | | |
|   Before aging | 139 | 180 | |
|   After aging | 134 | 171 | |
| Elongation (%) | | | |
|   Before aging | 880 | 740 | |
|   After aging | 720 | 510 | |
| 300% modulus (Kg/cm$^2$) | | | |
|   Before aging | 139 | 180 | |
|   After aging | 134 | 177 | |
| Hardness | | | |
|   Before aging | 66 | 68 | |
|   After aging | 68 | 70 | |
| Rebound (%) | | | |
|   Before aging | 40 | 42 | |
| Permanent compression set (%) | | | |
|   Before aging | 50 | 42 | |

(1) NBR having 35% comfined acrylonitrile, product of Japan Synthetic Rubber, Co., Ltd.

Example 4

Examples using various metal oxides:

A. Recipe

| Run No. | 1 | | 8 | | 9 | |
|---|---|---|---|---|---|---|
| BR (JSR BR01) | 100 | | 100 | | 100 | |
| ZnO | 0.4 | (4.9) | 0 | | 0 | |
| CdO | 0 | | 0.4 | (3.1) | 0 | |
| PbO | 0 | | 0 | | 1.2 | (5.4) |
| Diethylthiourea | 0.3 | | 0.3 | | 0.3 | |
| Vulcanization accelerator CZ | 1.6 | | 1.6 | | 1.6 | |
| Vulcanization accelerator TET | 0.2 | | 0.2 | | 0.2 | |
| Sulfur | 0.6 | | 0.6 | | 0.6 | |
| Antioxidant (C) | 1.7 | | 1.7 | | 1.7 | |
| Carbon black | 50 | | 50 | | 50 | |

Example 4 – Continued

Examples using various metal oxides:

B. Properties of Vulcanized Rubber (vulcanized at 150°C. for 15 minutes)

| Run No. | 1 | 8 | 9 |
|---|---|---|---|
| Tear strength (Kg/cm) | 96 | 49 | 64 |
| Tensile strength (Kg/cm$^2$) | 214 | 220 | 144 |
| Elongation (%) | 680 | 540 | 610 |
| 300% Modulus (Kg/cm$^2$) | 64 | 101 | 50 |
| Hardness | 61 | 64 | 57 |
| Rebound (%) | 49 | 56 | 49 |
| Permanent compression set (%) | 25 | 23 | 55 |

Example 5

Examples using various zinc salts

A. Recipe

| Run No. | 2 | 10 | 11 | 12 | 13 | 14 |
|---|---|---|---|---|---|---|
| BR (JSR BR01) | 100 | 100 | 100 | 100 | 100 | 100 |
| Zinc stearate | 4 (6.3) | 0 | 0 | 0 | 0 | 0 |
| Zinc laurate | 0 | 2.5(5.4) | 0 | 0 | 0 | 0 |
| Zinc carbonate | 0 | 0 | 0.5(4.0) | 0 | 0 | 0 |
| Zinc salt of mercaptobenzothiazole | 0 | 0 | 0 | 2(5.0) | 0 | 0 |
| Zinc dimethyldithiocarbamate | 0 | 0 | 0 | 0 | 2(6.5) | 0 |
| Lithopone (ZnS + BaSO$_4$) | 0 | 0 | 0 | 0 | 0 | 4(12.1) |
| Diethylthiourea | 0.3 | 0.3 | 0.3 | 0.3 | 0.30 | 0.3 |
| Vulcanization accelerator CZ | 1.6 | 1.6 | 1.6 | 1.6 | 1.6 | 1.6 |
| Vulcanization accelerator TET | 0.2 | 0.2 | 0.2 | 0.2 | 0.2 | 0.2 |
| Sulfur | 0.6 | 0.6 | 0.6 | 0.6 | 0.6 | 0.6 |
| Antioxidant (C) | 1.7 | 1.7 | 1.7 | 1.7 | 1.7 | 1.7 |
| Carbon black | 50 | 50 | 50 | 50 | 50 | 50 |

B. Properties of Vulcanized Rubber (vulcanized at 150°C. for 15 minutes)

| Run No. | 2 | 10 | 11 | 12 | 13 | 14 |
|---|---|---|---|---|---|---|
| Tear strength (Kg/cm) | 83 | 75 | 58 | 47 | 45 | 62 |
| Tensile strength (Kg/cm$^2$) | 196 | 203 | 224 | 217 | 210 | 130 |
| Elongation (%) | 710 | 712 | 620 | 600 | 550 | 720 |
| 300% Modulus (Kg/cm$^2$) | 57 | 58 | 84 | 81 | 89 | 31 |
| Hardness | 59 | 60 | 63 | 62 | 64 | 54 |
| Rebound (%) | 47 | 50 | 53 | 54 | 54 | 45 |
| Permanent compression set (%) | 34 | 40 | 31 | 25 | 19 | 47 |

Example 6

Examples using a small amount of sulfur

A. Recipe

| Run No. | 15 | 16 |
|---|---|---|
| BR (JSR BR01) | 100 | 100 |
| ZnO | 0.3 (3.7) | 0.45 (5.5) |
| Diethylthiourea | 0.3 | 0.3 |
| Stearic acid | 1 | 1 |
| Vulcanization accelerator CZ | 1.6 | 1.6 |
| Vulcanization accelerator TET | 0.2 | 0.2 |
| Sulfur | 0.2 | 0.2 |
| Antioxidant (C) | 1.0 | 1.0 |
| Carbon black | 50 | 50 |

B. Properties of vulcanized rubber (vulcanized at 150°C. for 15 minutes, and aged at 100°C. for 24 hours)

| Run No. | 15 | 16 |
|---|---|---|
| Tear strength (Kg/cm) | | |
| Before aging | 78 | 76 |
| Tensile strength (Kg/cm$^2$) | | |
| Before aging | 145 | 180 |
| After aging | 136 | 171 |
| Elongation (%) | | |
| Before aging | 650 | 640 |
| After aging | 620 | 620 |
| 300% Modulus (Kg/cm$^2$) | | |
| Before aging | 39 | 56 |
| After aging | 47 | 64 |
| Hardness | | |
| Before aging | 50 | 55 |
| After aging | 52 | 57 |
| Rebound (%) | | |
| Before aging | 44 | 48 |
| Permanent compression set (%) | | |
| Before aging | 34.4 | 30.4 |

Example 7

Examples using various amine-type antioxidants

A. Recipe

| Run No. | 17 | 18 | 19 | 20 | 21 |
|---|---|---|---|---|---|
| BR (JSR BR01) | 100 | 100 | 100 | 100 | 100 |
| ZnO | 0.4 (4.9) | 0.4 (4.9) | 0.4 (4.9) | 0.4 (4.9) | 0.4 (4.9) |
| Diethylthiourea | 0.4 | 0.4 | 0.4 | 0.4 | 0.4 |
| Stearic acid | 1 | 1 | 1 | 1 | 1 |
| Vulcanization accelerator CZ | 1.6 | 1.6 | 1.6 | 1.6 | 1.6 |
| Vulcanization accelerator TET | 0.2 | 0.2 | 0.2 | 0.2 | 0.2 |
| Sulfur | 0.7 | 0.7 | 0.7 | 0.7 | 0.7 |
| Carbon black | 30 | 30 | 30 | 30 | 30 |
| Antioxidants | | | | | |
| Diphenyl-p-phenylene diamine | 2 | 0 | 0 | 0 | 0 |
| N-phenyl-N'-isopropyl-p-phenylene diamine | 0 | 2 | 0 | 0 | 0 |
| Di-β-naphthyl-p-phenylene diamine | 0 | 0 | 2 | 0 | 0 |
| Phenyl-β-naphthylamine | 0 | 0 | 0 | 2 | 0 |
| Phenyl-α-naphthylamine | 0 | 0 | 0 | 0 | 2 |

B. Properties of vulcanized rubber (vulcanized at 150°C. for 15 minutes, and aged at 100°C. for 96 hours)

| Run No. | 17 | 18 | 19 | 20 | 21 |
|---|---|---|---|---|---|
| Tensile strength (Kg/cm$^2$) | | | | | |
| Before aging | 163 | 179 | 191 | 153 | 156 |
| After aging | 90 | 76 | 85 | 70 | 82 |
| Elongation (%) | | | | | |
| Before aging | 412 | 477 | 488 | 421 | 441 |
| After aging | 231 | 228 | 245 | 164 | 240 |
| 100% modulus (Kg/cm$^2$) | | | | | |
| Before aging | 20.8 | 20.5 | 22.0 | 19.5 | 18.3 |
| After aging | 26.5 | 25.6 | 23.7 | 22.0 | 23.1 |

What is claimed is:

1. In the rubber compositions for making vulcanized butadiene rubbers comprising polybutadiene, a vulcanizing agent consisting essentially of sulfur, and a vulcanizing activator, the improvement in which the amount of the vulcanizing agent, sulfur, is 0.1 to 0.6 gram per 100 grams of the rubber component, and the vulcanizing activator is at least one metal compound selected from the group consisting of zinc oxide, zinc compound selected from the group consisting of zinc carbonate, lithopone, fatty acid salts of zinc, dithioacid salts of zinc and thiazole salts of zinc, lead monoxide and cadmium oxide, the amount of which corresponds to 1.23 to 6.2 milligram atoms of the metal per 100 grams of the rubber component.

2. The composition of claim 1, wherein the vulcanizing activator is zinc oxide.

3. The composition of claim 1, which further contains at least one compound selected from the group consisting of aldol-α-naphthylamine, phenyl-β-naphthylamine and para-phenylenediamine in an amount up to 2.5 grams per 100 grams of the rubber component.

4. The composition of claim 3, wherein the amount of the antioxidant is 1 to 2.5 grams.

5. The composition of claim 1, which further contains besides said metal compound as a vulcanizing activator, at least one dialkylthiourea or diarylthiourea in an amount of 0.1 to 1 gram per 100 grams of the rubber component.

6. The composition of claim 5, wherein the amount of the dialkylthiourea or diarylthiourea is 0.1 to 0.5 gram.

7. The composition of claim 3, which further contains besides said metal compound as a vulcanizing activator, at least one dialkythiourea or diarylthiourea in an amount of 0.1 to 1 gram per 100 grams of the rubber component.

8. Vulcanized butadiene rubber obtained by vulcanizing the composition of claim 1.

9. The rubber composition according to claim 1 which consists essentially of 100 grams of polybutadiene, 0.1 to 0.6 gram of sulfur, 0.5 to 2.5 grams of at least one vulcanizing accelerator, at least one metal compound selected from the group consisting of zinc oxide, zinc compound selected from the group consisting of zinc carbonate, lithopone, fatty acid salts of zinc, dithioacid salts of zinc and thiazole salts of zinc, lead monooxide and cadmium oxide as a vulcanizing activator in an amount corresponding to 1.23 to 6.2 milligram atoms of the metal, 0.1 to 1.0 gram of at least one other vulcanizing activator, and up to 2.5 grams of at least one compound selected from the group consisting of aldol-α-naphthylamine, phenyl-β-naphthylamine and paraphenylenediamine.

10. Vulcanized polybutadiene rubber obtained by vulcanizing the composition of claim 9.

* * * * *